Aug. 1, 1961     O. E. ANGELL     2,994,291

ANCHOR STORAGE AIDS AND ASSOCIATED METHODS

Filed Nov. 30, 1959

INVENTOR.
OLAV ANGELL

BY Alan K. Roberts

ATTORNEY

United States Patent Office 2,994,291
Patented Aug. 1, 1961

2,994,291
ANCHOR STORAGE AIDS AND ASSOCIATED METHODS
Olav E. Angell, Brooklyn, N.Y.
(S.S. "Exminster," American Export Line, Hoboken, N.J.)
Filed Nov. 30, 1959, Ser. No. 856,152
1 Claim. (Cl. 114—200)

This invention relates to anchor storage aids and, more particularly, to devices for securing anchor chains and the like. The invention also relates to associated methods.

When an anchor is stored on a maritime vessel, its chain or other such connecting element is generally stored in what is known as a chain locker. Normally the chain is passed through an opening in the desk or bulkhead forming the upper covering of the chain locker and it is desirable that the chain be immobilized in said opening and that the opening be rendered watertight. The chain is immobilized in order to prevent damage to the deck or bulkhead in which said opening is located, and the opening is rendered watertight so as to minimize exposure of the chain to the corrosive action of the water.

It is an object of the invention to provide improved methods and arrangements pertaining to the immobilization of a chain or the like in the opening of a chain locker and the rendering of said opening watertight.

It is another object of the invention to provide improved means to immobilize a chain in the opening of a chain locker without employing a rigid connection to the chain so that limited movements of the chain can be accommodated so as to avoid imparting the chain forces to the associated chain locker.

It is a further object of the invention to provide improved methods and arrangements for immobilizing chains in chain lockers in an extremely convenient manner.

Briefly, the invention achieves the above and other of its objectives by providing in the opening of a chain locker an inflatable or expansible member in which is accommodated a crushable member through which the side chain passes. When the chain is in position, the first said member is inflated or otherwise expanded so as to urge the crushable member firmly against the chain. This has the effect of resiliently immobilizing the chain, while at the same time rendering the opening in the associated chain locker watertight.

Advantageously, apparatus of the invention is economical to employ.

Other objectives and advantages of the invention, as well as features thereof, will be found in the following detailed description of some preferred embodiments which are illustrated in the accompanying drawing in which.

Figure 1:
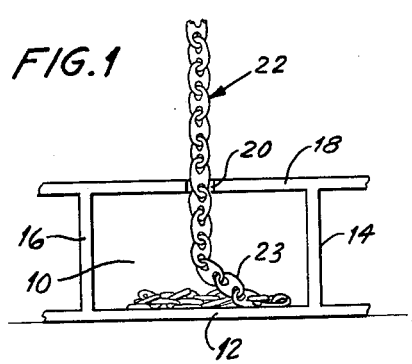
FIG. 1 is a diagrammatic view illustrating the environment of the invention.

Referring first to FIG. 1, a portion of a maritime vessel is illustrated comprising a chain locker 10 having a deck 12, side walls 14 and 16 and an upper deck or bulkhead 18 constituting the upper covering element of the chain locker.

In the bulkhead 18 is provided an opening 20 through which passes the chain 22 which is generally permitted to fall in arbitrary manner indicated at 23 in the chain locker.

Figure 2:
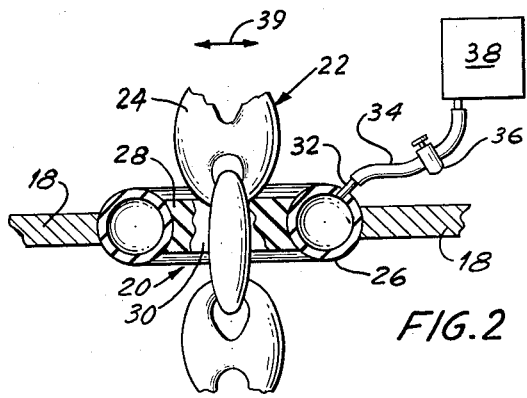
FIG. 2 illustrates in side and partially sectional view and partly in diagrammatic form, a first embodiment of the invention.
Figure 4:
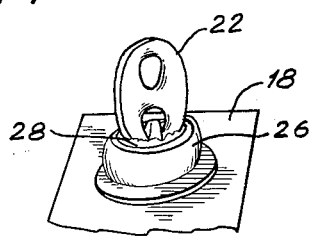
FIG. 4 is a perspective view of the structure illustrated in FIGS. 2 and 3.
Figure 3:
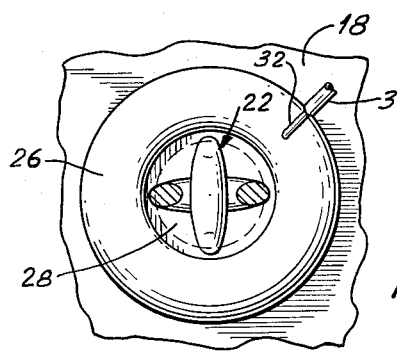
FIG. 3 is a top plan view of various of the elements of FIG. 2.

In FIGS. 2–4 is illustrated the bulkhead or deck 18 with links 24 of chain 22 passing through the opening 20 in said bulkhead.

In accordance with the invention, an inflatable member 26 is peripherally engaged in said opening, this member being in the form of a toroid or circle so that the chain may pass therethrough into the locker 10.

Also provided is a resilient crushable member 28 which fits within the inflatable member 26 and is provided with an opening 30 through which the chain can be passed.

The inflatable tube 26 is exemplary of an expansible member by means of which radial contractile forces may be applied to the crushable member 28 so as to apply the latter firmly against the chain. Member 28 may be, for example, of a heavy foam rubber and is preferably of a conventional foam rubber material wherein the cells are isolated from one another so as to render member 28 water impermeable.

The inflatable member 26 may be a heavy rubber tube provided, for example, with a valve 32 to which may be connected a conduit 34 controlled by a conventional valve 26. Connected to conduit 34 is a source 38 of a medium adapted to inflate the tube 26. The medium is preferably a pneumatic medium which is compressible, but may alternatively be a fluid substance.

With the chain in position, as is readily permitted with the tube 26 deflated, the inflating medium is passed via conduit 34 to the tube 26 to inflate the same. As indicated above, crushable member 28, which is also preferably resilient, is urged into and against the links 24 of the chain 22 such as to constitute a brace between the bulkhead 18 and said chain. This brace will yield somewhat when the chain tends to move in the directions indicated by arrow 38, but will be sufficiently strong as to prevent contact of the chain with the bulkhead 18. Thus no damage to the latter can result nor will forces created by movement of the chain be directly imparted to said bulkhead. Moreover, the arrangement will at all times provide a water impermeable barrier preventing ingress of water into the locker 10 so that the arrangement of the invention fully accomplishes the objectives set forth above.

Figure 5:
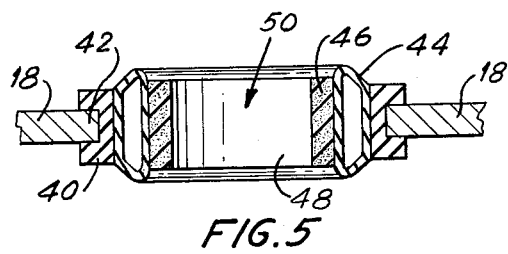
FIG. 5 is a side sectional view of a further embodiment of the invention.
Figure 6:
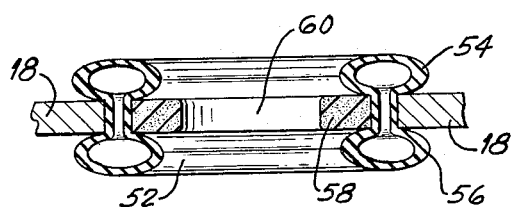
FIG. 6 is a side sectional view of still another embodiment of the invention.
Figure 7:
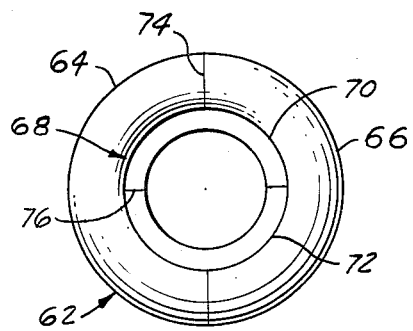
FIG. 7 illustrates a modification which may be applied to the above indicated embodiments of the invention.

The structure of the invention may take many forms as have been illustrated in part in FIGS. 5–7.

In FIG. 5 an annular ring 40 is provided with an annular recess 42 for engaging the perimeter of the opening in the bulkhead 18. To ring 40 is attached an inflated tube 44 which constitutes in this embodiment the expansible element. Internally of the inflatable tube 44 is accommodated a soft, resilient ring 46 of rubber having an opening 48 through which the chain may pass in the direction of the arrow 50 into chain locker 10.

As in the previously discussed embodiment, the method of the invention comprises inflating the tube 44 with the chain in position so as to crush the member 46 against the links of the chain.

In FIG. 6 an inflatable tube 52 is given the cross section of an hour glass so that the knobs 54 and 56 thereof provide a recess for the accommodation of the perimeter of the opening in bulkhead 18. In the opposite recess is accommodated the resilient crushable member 58 which is provided with a central opening 60 wherethrough the chain may be passed.

Again the method of invention involves the inflating of tube 52 with the chain in place so as to immobilize the chain and provide for excluding water from the locker 10.

According to the embodiment illustrated in FIG. 7, it is not necessary that the inflatable tube be positioned prior to the insertion of the chain into the chain locker. To this end, the embodiment illustrated in FIG. 7 comprises an inflatable or expansible member 62 having two independent sections 64 and 66 which may be positioned in the opening of the bulkhead 18 (not illustrated in this figure) after the chain has been positioned as desired. In this embodiment of the invention, a crushable member 68 is provided in two sections 70 and 72 so that this member can likewise be positioned when the chain has finally arrived at the desired position.

It is to be noted that in this latter embodiment, the sections of members 62 and 68 meet respectively along lines 74 and 76 which are angularly displaced from one another by approximately 90° so as to prevent the chain from moving directly against the associated bulkhead.

The anchor storage aids described above are characterized by the inclusion of an inflatable member peripherally engaged in an opening of the bulkhead of a chain locker with a bulky crushable member being located within the inflatable member. The crushable member is provided with an opening to accommodate a chain and means are provided to inflate the inflatable member to crush the crushable member against the chain to immobilize the latter and to constitute a water impermeable barrier. Preferably, the medium employed to inflate the inflatable member is a pneumatic medium which is compressible and will thus convert said movements of the chain into heat rather than tend to transmit such movements as forces to the associated bulkhead.

As stated above, the crushable member is preferably formed of foam rubber having isolated cells which not only result in optimum resistance to the passage of water, but adds materially to the resistance to movement of the associated chain. The inflatable member may simply be a rubber tube made of heavy gage rubber, reinforced where the bulkhead is engaged.

The inflatable and crushable members may be concentric circular members. These members may further be in endless form or may be provided as sections whereupon they may be located after the chain is in position.

There will now be obvious to those skilled in the art many modifications and variations of the structures set forth above. These modifications and variations will not, however, depart from the scope of the invention if they come within the bounds of the following claim.

What is claimed is:

An anchor storage aid for supporting an anchor chain of determinable maximum breadth in an opening in a bulkhead of a chain locker, said storage aid comprising an endless circular inflatable member peripherally engaged in said opening, means on said inflatable member having outwardly extending annular flanges defining an annular groove for engaging said bulkhead adjacent said opening, a bulky crushable member of endless circular form concentric with and located within said inflatable member and having a generally circular opening of about said maximum determinable breadth to permit the free passage of said chain, said crushable member being of a foam material impermeable to water, and means coupled to said inflatable member to inflate the same to crush said crushable member against said chain to render said chain locker watertight while immobilizing said chain.

References Cited in the file of this patent
UNITED STATES PATENTS

| | | |
|---|---|---|
| 293,610 | Winter | Feb. 12, 1884 |
| 2,652,018 | Griffith | Sept. 15, 1953 |
| 2,841,422 | Badger | July 1, 1958 |